US009193460B2

(12) United States Patent
Laudrain

(10) Patent No.: US 9,193,460 B2
(45) Date of Patent: Nov. 24, 2015

(54) METHOD FOR BOARDING AND UNLOADING OF PASSENGERS OF AN AIRCRAFT WITH REDUCED IMMOBILIZATION TIME OF THE AIRCRAFT, AIRCRAFT AND AIR TERMINAL FOR ITS IMPLEMENTATION

(71) Applicant: AIRBUS OPERATIONS (S.A.S.), Toulouse (FR)

(72) Inventor: Yann-Henri Laudrain, La Turballe (FR)

(73) Assignee: Airbus Operations (S.A.S.), Toulouse (FR)

( * ) Notice: Subject to any disclaimer, the term of this patent is extended or adjusted under 35 U.S.C. 154(b) by 311 days.

(21) Appl. No.: 13/781,060

(22) Filed: Feb. 28, 2013

(65) Prior Publication Data

US 2013/0228651 A1    Sep. 5, 2013

(30) Foreign Application Priority Data

Mar. 1, 2012 (FR) ...................................... 12 51882

(51) Int. Cl.
| | |
|---|---|
| *B64D 9/00* | (2006.01) |
| *B64C 39/02* | (2006.01) |
| *B64F 1/30* | (2006.01) |
| *B64F 1/31* | (2006.01) |

(52) U.S. Cl.
CPC . *B64D 9/00* (2013.01); *B64C 39/02* (2013.01); *B64F 1/30* (2013.01); *B64F 1/31* (2013.01); *B64C 2211/00* (2013.01); *Y02T 50/82* (2013.01)

(58) Field of Classification Search
CPC .............. B64F 1/30; B64F 1/31; B64D 9/00; B64D 11/00; B64C 1/32; B64C 39/00; B64C 39/02; B64C 2211/00
See application file for complete search history.

(56) References Cited

U.S. PATENT DOCUMENTS

| | | | | |
|---|---|---|---|---|
| 2,388,380 | A | * 11/1945 | Bathurst | ..................... 244/118.2 |
| 6,494,404 | B1 | 12/2002 | Meyer | |
| 7,344,110 | B2 | * 3/2008 | Giannakopoulos | ........... 244/140 |

FOREIGN PATENT DOCUMENTS

| | | |
|---|---|---|
| DE | 199 34 210 | 7/1999 |
| DE | 103 09 436 | 9/2004 |
| GB | 2 326 863 | 4/1997 |

* cited by examiner

*Primary Examiner* — Nicholas McFall
(74) *Attorney, Agent, or Firm* — Jenkins, Wilson, Taylor & Hunt, P.A.

(57) ABSTRACT

Methods for transferring a payload such as passengers and/or luggage and/or freight between an airport and a cabin of an aircraft are provided. Air terminals, aircraft and removable cabin modules suitable for implementing these methods are also provided. An aircraft is provided which includes a removable cabin module. A docking module is also provided for transferring a removable cabin module between an aircraft and an airport. A method for modifying the internal configuration of the cabin of such an aircraft by replacing a removable cabin module of the aircraft is also provided.

19 Claims, 6 Drawing Sheets

METHOD FOR BOARDING AND UNLOADING OF PASSENGERS OF AN AIRCRAFT WITH REDUCED IMMOBILIZATION TIME OF THE AIRCRAFT, AIRCRAFT AND AIR TERMINAL FOR ITS IMPLEMENTATION

TECHNICAL FIELD

The present invention relates to a method for transferring a payload, such as passengers and/or luggage and/or freight, between an aerodrome or airport and a cabin of an aircraft, and in particular an aeroplane.

It relates in particular to a method of loading or unloading a payload implementing said transfer method.

The invention also relates to an aircraft and an airport building, such as an air terminal, allowing implementation of these methods.

The invention also relates to a method for modifying the internal configuration of an aircraft cabin for the transport of passengers and/or luggage and/or freight.

BACKGROUND

Transferring a payload in a commercial aeroplane requires that the aeroplane is immobilized on the ground. This is the case when boarding passengers, but also when loading their luggage, or again when loading freight. In addition, settling passengers in their respective seats in the aeroplane may lengthen the aeroplane's period of immobilisation.

Air terminals habitually include multiple boarding rooms from which the departing passengers can reach their respective aeroplanes, possibly via a footbridge, or by means of a transfer in a land vehicle. These rooms sometimes also allow passengers to pass through them when deplaning.

These boarding rooms are generally accessible through an area dedicated to security controls intended to check the identities of the departing passengers, and to prevent prohibited objects being introduced into the cabin.

In order to limit the necessary area of the boarding rooms, access to each control area and each associated boarding room is generally authorised only when the aeroplane is available for boarding the passengers, so that the latter do not have to wait in the boarding room. As a consequence the aeroplane is also immobilized during the entire duration of the passenger control.

The operations to check the passengers, to board them and to load their luggage, and/or the freight loading operations, may consequently lead to periods of immobilisation on the ground of the aeroplanes which are greater than the time required for the pre-flight operations, such as the provision of fuel, the routine technical checks, cleaning of the passenger cabin, or again the preparation of the flight plan by the pilots.

And, generally, the period of immobilisation on the ground of the aeroplanes between two successive flights increases their operational cost. Indeed, the longer this period of immobilisation, the less the actual flight time of each aeroplane. A long period of immobilisation on the ground can also result in additional fuel consumption.

Furthermore, the internal configuration of the cabin intended to transport a payload in an aeroplane is determined when the aeroplane is manufactured, and cannot easily be modified during the aeroplane's period of commercial exploitation.

As a consequence, airlines which wish to offer different types of cabins, in particular different levels of comfort, according to the type of journey, the timetable, or for other reasons, must have more aeroplanes. This leads to additional costs for these airlines.

In addition, the production of an aeroplane includes testing before delivery, which requires a special modification of the passenger cabin, and therefore a subsequent modification of this cabin after testing, to prepare for the delivery of the aeroplane to its purchaser. Such a modification of the cabin increases the overall duration of the aeroplane's production cycle, and therefore its cost price.

SUMMARY

One aim of the invention is notably to provide a simple, economic and efficient solution to these problems, allowing at least some of the above-mentioned disadvantages to be avoided.

The invention proposes to this end a method for transferring a payload, such as passengers and/or luggage and/or freight, between an aerodrome or airport and a cabin of an aircraft, and in particular an aeroplane.

According to the invention, the cabin forms part of a removable cabin module, which is in a state of separation from the aircraft, and docked to a docking module external to the aircraft during the transfer.

The term docking is understood to mean any form of reversible temporary attachment between the cabin module and a docking module.

The invention thus enables the payload to be transferred independently of the aircraft. The aircraft can then be used for other purposes during the transfer. In particular, it is not necessary for the aircraft to be immobilised on the ground during this transfer.

The above-mentioned docking module is preferably integrated in an airport building, such as an air terminal.

Docking of the cabin module to the docking module thus enables the cabin to be brought as close as possible to the location towards which—or away from which—the payload transfer is to take place.

The invention thus enables use of telescopic footbridges or land vehicles for the transport of passengers, their luggage, or freight between the aircraft and the airport building to be avoided.

A floor of the cabin preferentially extends roughly at the height of a floor of an aircraft building room during the transfer.

Transfer of passengers, luggage or freight can thus be accomplished optimally, and in particular without using a staircase or a lift or elevator.

The invention also relates to a method for loading a payload, such as passengers and/or luggage and/or freight, on board an aircraft, in particular an aeroplane, including the following steps:

transfer of the payload from an aircraft building to a cabin integrated in a removable cabin module separated from the aircraft, and docked to a docking module integrated in the building, in accordance with a method of transfer of the type described above;

movement of the cabin module, from the docking module to a cabin module reception space in the aircraft;

activation of retaining means holding the cabin module in the reception space.

In the case of a cabin intended for passenger transport, the passengers can be seated in their respective seats over a relatively lengthy period, without this requiring costly immobilisation of the aircraft.

The security checks can in addition be undertaken when entering the cabin, and can be staggered over time.

In addition, the boarding method makes the presence of waiting rooms in the aircraft building superfluous, and thus makes possible substantial economies in terms of area.

The cabin module can be moved by means of a device forming part of the docking module, in which case the cabin module is detached from the lifting device, and therefore undocked from the docking module at the end of the cabin module's movement.

As a variant, the device allowing the cabin module to be moved can be separated from the docking module and, for example, be integrated in the aircraft or in an auxiliary land vehicle, in which case the cabin module is advantageously undocked from the docking module at the start of the process of moving the cabin module.

Furthermore, the means for retaining the cabin module in the aeroplane's reception space are preferably means which can be remotely activated.

The boarding method described above can naturally include a prior step of docking the cabin module to the docking module.

The invention also relates to a method for unloading a payload, such as passengers and/or luggage and/or freight, from an aircraft, in particular an aeroplane, including the following steps:

deactivation of retaining means holding a removable cabin module containing the payload in a reception space in the aircraft;

moving the cabin module from the reception space to a docking module integrated in an aircraft building;

transferring the payload into the airport building, in accordance with a transfer method of the type described above.

The movement of the cabin module can be accomplished by means of a device forming part of the docking module, in which case the cabin module is attached to this device, and therefore docked to the docking module, before the cabin module is moved.

As a variant, when the device allowing the cabin module to be moved is separated from the docking module and, for example, is integrated in the aircraft or in an auxiliary land vehicle, the cabin module can be docked to the docking module when it has been moved.

In the loading and unloading methods described above the moving the cabin module advantageously includes passing it through an opening made in a floor of a room of said airport building.

The cabin module can therefore be housed within the above-mentioned room during implementation of the payload transfer method described above. By this means the path taken by this payload during its transfer can be optimised.

The invention also relates to an aircraft, in particular an aeroplane, including a reception space for a removable cabin module including a floor and an upper aircraft fuselage portion connected to the floor in order to delimit with the latter a cabin for the transport of passengers and/or luggage and/or freight, where said space is defined outside a cockpit of the aircraft and above a lower structure of the aircraft, and where the latter also includes centring means in order to centre such a cabin module in the reception space, and retention means to hold such a cabin module in the reception space.

The horizontal, vertical, upper and lower directions are defined for the aircraft when it is posed on the ground.

The aircraft according to the invention allows implementation of the methods of payload transfer, loading and unloading described above.

It should be noted that the aircraft's cockpit is attached to it, and allows one or more pilots in this cockpit to pilot the aircraft, even when no removable cabin module is installed in the aircraft, at least during its ground movements. This being so, the flight deck and seats for the pilots are, naturally, housed in the aircraft's cockpit.

The centring means are preferably able to guide the cabin module to its final position in the reception space while this cabin module is being docked to the aircraft.

The reception space for the removable cabin module is preferably open at the top.

This allows a cabin module to be moved easily from this space to a raised docking module of an aircraft building, and also the reverse movement.

Furthermore, the above-mentioned retention means can advantageously be controlled remotely. The associated control means can notably be located in the cockpit, or in the cabin module, or again outside the aircraft.

When the aircraft is an aeroplane, the above-mentioned lower structure preferably includes a fuselage portion of the aeroplane including its wing root, i.e. the region where the wings are joined to the fuselage.

This portion of the aeroplane is, indeed, particularly rigid, and therefore enables an optimum connection to be provided between the aeroplane and a removable cabin module installed in the aeroplane's reception space.

In addition, said reception space for a removable cabin module is preferably delimited between a nose cone of the aeroplane including its cockpit, and a tail cone of the aeroplane including a tail unit thereof.

Furthermore, said lower structure advantageously consists of a lower portion of the aeroplane's fuselage, which is for example truncated in a horizontal plane.

Such a horizontal plane is, naturally, essentially parallel to the wings of the aeroplane.

As a consequence, the aeroplane can receive a removable cabin module delimited by a flat lower wall. Such a wall can advantageously directly form the floor for the passenger or freight cabin formed inside the cabin module.

The invention also relates to a removable cabin module for an aircraft of the type described above, including a floor and an upper aircraft fuselage portion connected to said floor so as to delimit with the latter a cabin for the transport of passengers and/or luggage and/or freight, where said module also includes centring means intended to centre the module in a reception space in said aircraft, and retention means intended to hold the module in such a reception space.

The floor preferably extends parallel to a plane truncating said fuselage portion. This being so, the floor can be formed by a lower wall delimiting the cabin module, as explained above, or alternatively may extend within this module parallel to such a lower wall.

The fuselage portion is preferably shaped roughly like a cylinder portion.

The cabin module preferentially also includes docking elements to dock said module to a docking module outside the aircraft.

The invention also relates to a docking module for docking a removable cabin module of the type described above to an airport building.

Such a docking module allows implementation of the methods of payload transfer, loading and unloading described above.

The docking module advantageously delimits a compartment intended to house a removable cabin module.

In this case, the docking module preferably includes a vertical wall laterally delimiting said compartment, and having at least one access door.

This door is preferably designed such that it is facing a door of a removable cabin module when the latter is housed in said compartment.

Furthermore, the docking module advantageously includes a lifting device to enable removable cabin modules to be moved.

As a variant, such a lifting device can be integrated in a device outside the docking module, for example an auxiliary land vehicle, or another portion of the airport building.

The invention also relates to an aircraft building, such as an air terminal, including at least one docking module of the type described above, designed so as to allow a room of said building to be linked to a cabin housed in a removable cabin module of the type described above, when this cabin module is docked to said docking module.

The above-mentioned room of said building thus allows passengers or freight to transit to or from the removable cabin module.

Said room advantageously includes a floor having at least one opening allowing said removable cabin module to pass through.

Such an opening provides an effective means to introduce removable cabin modules within the room, as explained above.

Said opening is preferably positioned above an aircraft apron.

The path followed by a removable cabin module between an aircraft and the above-mentioned docking module can thus be reduced optimally.

In addition, said docking module advantageously includes closing means allowing at least partial closing of said opening.

Such closing means provide a contribution to the support of a removable cabin module docked to said docking module.

The invention also relates to an airport including at least one building of the type described above.

Finally, the invention relates to a method for modifying the internal configuration of a cabin for transporting passengers and/or luggage and/or freight within an aircraft, said method including at least the following steps:

deactivation of retaining means holding a first removable cabin module in a reception space in the aircraft;

removal of this first cabin module outside said reception space;

installation, in said reception space, of a second removable cabin module having an internal configuration different to that of said first removable cabin module;

activation of retaining means holding the second cabin module in said reception space.

Such a method notably enables the commercial exploitation of the aircraft to be optimised, by allowing easy modification of the internal configuration of the aircraft's cabin. It is thus simple to modify the degree of comfort provided to the passengers between two flights, or again to replace a passenger cabin by a freight cabin.

In the course of manufacture of the aircraft, this method enables the aircraft to be easily fitted with a cabin dedicated to testing, and this cabin to be then replaced by a cabin dedicated to commercial exploitation of the aircraft, to prepare for its delivery.

BRIEF DESCRIPTION OF THE DRAWINGS

The invention will be better understood, and other details, advantages and characteristics of it will appear, on reading the following description given as a non-restrictive example, and with reference to the appended illustrations, in which.

DETAILED DESCRIPTION

The detailed description below relates to an example of an aircraft according to a preferred embodiment of the invention, in this case an aeroplane, together with an air terminal designed to allow commercial exploitation of this aircraft, and more specifically suitable for implementing the innovative methods for loading and unloading the payload of this aircraft.

Figure 1:
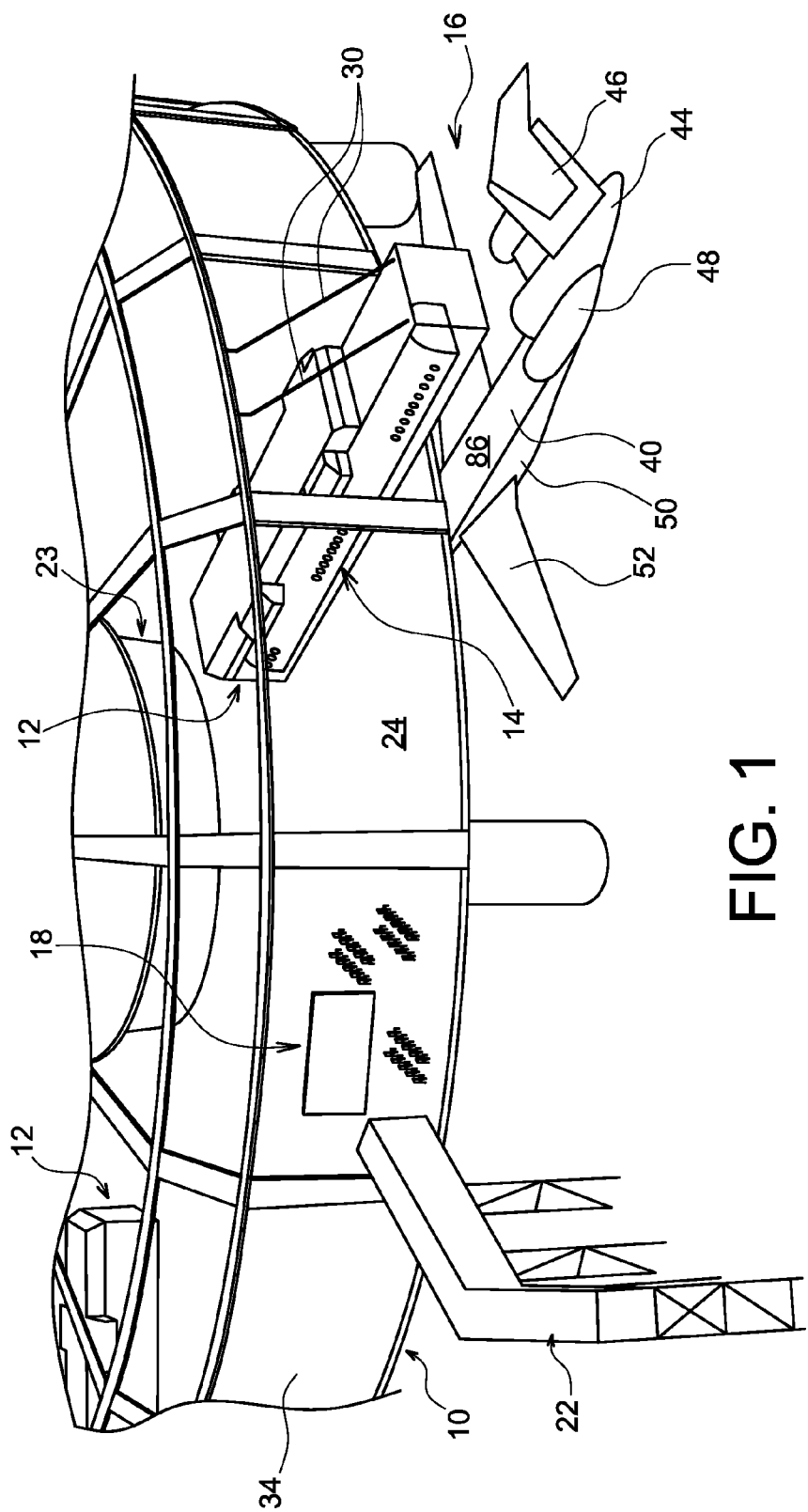
FIG. 1 is a schematic bird's eye view of an air terminal and of an aircraft according to a preferred embodiment of the invention, showing the aircraft's removable cabin module docked to a docking module integrated in the air terminal.
Figure 2:
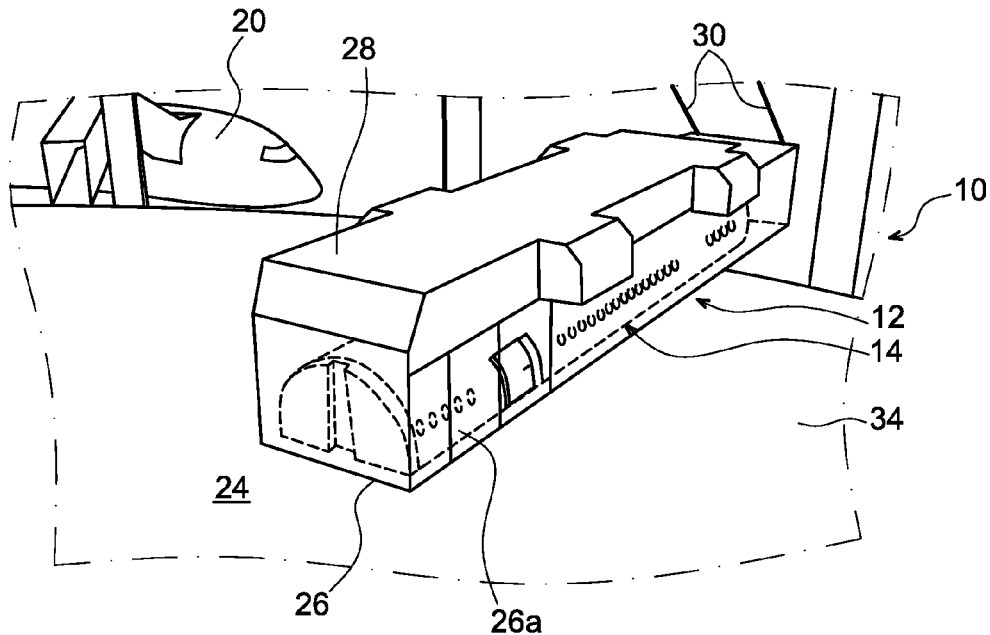
FIG. 2 is a partial schematic view at a larger scale of the air terminal of FIG. 1, showing said docking module and said removable cabin module.
Figure 3:
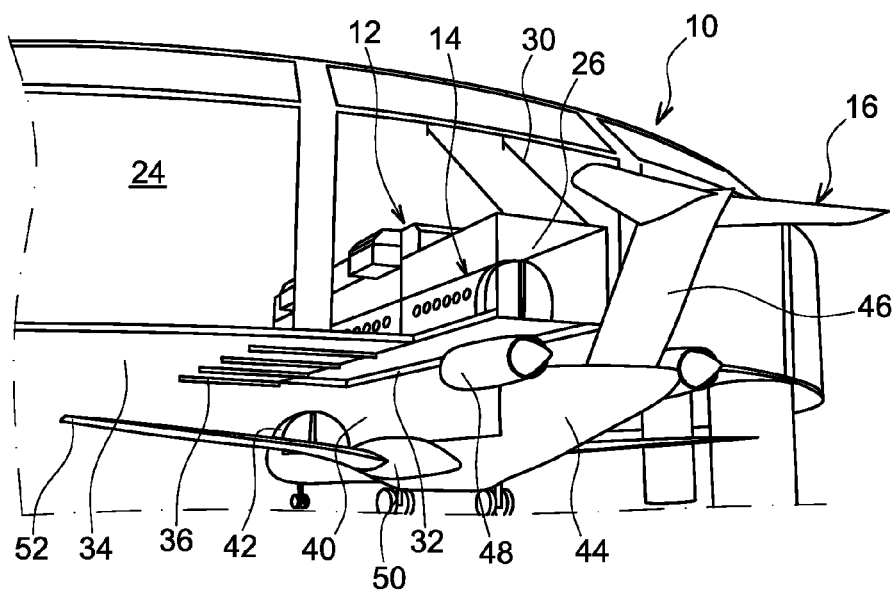
FIG. 3 is a partial schematic perspective view from below of the air terminal and of the aircraft of FIG. 1.

Air terminal 10 is represented in FIGS. 1 to 3. This air terminal includes docking modules 12 allowing the docking of removable cabin modules 14, intended to be installed in aeroplanes 16 in accordance with the preferred embodiment of the invention. FIGS. 1 and 3 show an example of such an aircraft 16 and of a removable cabin module 14 including a cabin for transporting the passengers of the aeroplane, which will be described in greater detail below. Cabin module 14 is docked to air terminal 10 by means of a docking module 12, to allow the passengers of the aeroplane to be boarded or deplaned respectively, using methods which will be described below. In these figures, aeroplane 16 is positioned under docking module 12, and is ready to receive removable cabin module 14.

The air terminal also includes conventional boarding rooms 18 (FIG. 1), illustrated in a very simplified manner, allowing access to conventional aircraft 20 (FIG. 2) via respective footbridges 22 (FIG. 1).

In this example, the air terminal is essentially circular in shape, and conventional boarding rooms 18 and docking modules 12 are positioned around a central portion 23 of the air terminal.

As is shown more clearly in FIG. 2, docking module 12 forms a compartment for removable cabin module 14 within a room 24 of air terminal 10. This compartment is delimited by vertical wall 26, made for example of transparent glass, fitted with a sliding door 26a, and by an essentially horizontal roof wall 28. In the illustrated embodiment this compartment projects outside the air terminal (FIG. 1). In this case, the outer end of the compartment is supported, for example, by braces 30 attached to the structure of the air terminal.

The compartment of docking module 12 is designed around an opening 32 (FIG. 3) made in a floor 34 of room 24 of air terminal 10, through which removable cabin module 14 can pass. Docking module 12 also includes beams 36 which can be moved between a deployed position, in which these beams traverse said opening 32 and contribute to the support of removable cabin module 14, and a retracted position (illustrated in FIG. 3), in which the beams are separated from opening 32 to enable removable cabin module 14 to pass through this opening. The beams 36 form closing means allowing partial closing of the docking module 12.

Docking module 12 also includes a device for lifting the removable cabin module, which will be described below.

As is shown by FIG. 2, when removable cabin module 14 is resting on beams 36, a floor of the cabin of said module extends roughly in the area of floor 34 of room 24 such that the passengers can be transferred between the cabin and room 24 without using a staircase or a lift.

FIGS. 1 and 3 illustrate aeroplane 16, which includes a reception space 40 with an upper opening, which is able to receive removable cabin module 14. This space is delimited at the front by a nose cone 42 of the aeroplane (FIG. 1), which includes the aeroplane's cockpit, and this space is delimited to the rear by a tail cone 44 of the aeroplane which includes the aircraft's tail unit 46, and which supports two engines 48 of the aeroplane, in the illustrated example. Reception space 40 is defined above a lower structure 50 of the aeroplane, to which wings 52 of the aeroplane are connected. In this example, lower structure 50 includes a hold of the aeroplane but, as a variant, it may be removable cabin module 14 which includes a space for storage of luggage and/or freight positioned beneath and/or above the passenger cabin. As a variant, the cabin module may be completely dedicated to freight transport.

Figure 4:
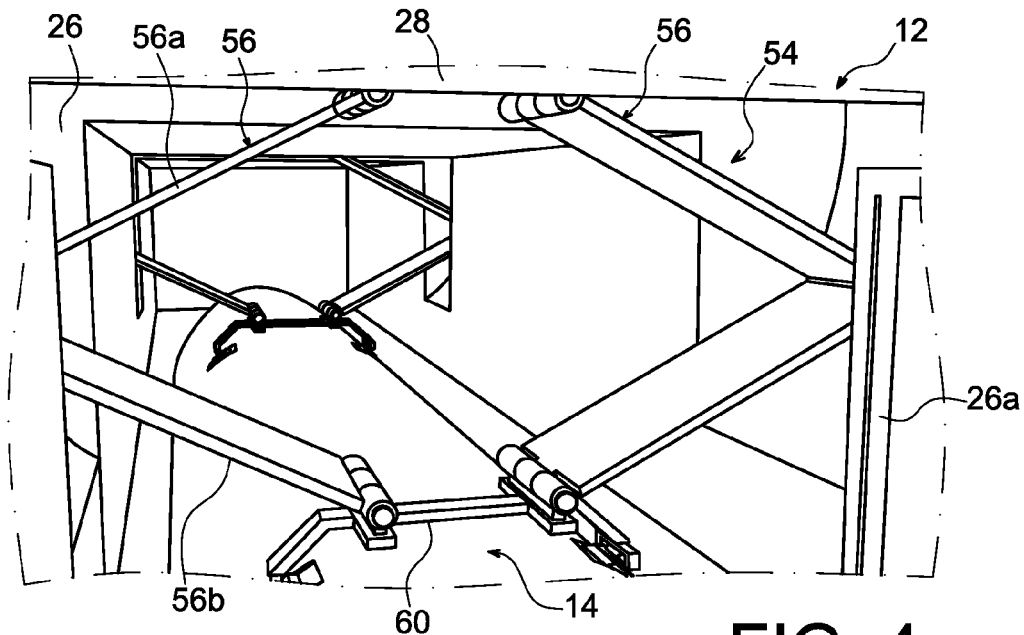
FIG. 4 is a partial schematic view of the docking module and of the removable cabin module in the course of transferring the latter from the docking module to the aircraft.

FIG. 4 represents the interior of the compartment defined by docking module 12, and shows very schematically a portion of device 54 for lifting a removable cabin module.

This device 54 essentially includes two lifting mechanisms, each including two hinged arms 56, together forming a deformable parallelogram system. Each of arms 56 includes an upper portion 56a which is hinged at its upper end to roof wall 28 of docking module 12, together with a lower portion 56b which is hinged at its upper end to the lower end of upper portion 56a.

Each lifting mechanism includes an attachment device 60 to which respective lower portions 56b of both arms 56 are connected, and which has two hinged hooks which can be rotated by remotely controlled motorised means, between a clamped position allowing removable cabin module 14 to be suspended from lifting device 54, and an unclamped position enabling module 14 to be released, as will be shown more clearly below.

Lifting device 54 also includes motorised means able to cause a deformation of each lifting mechanism in the shape of a deformable parallelogram, in order to lift or lower attachment device 60.

Figure 5:
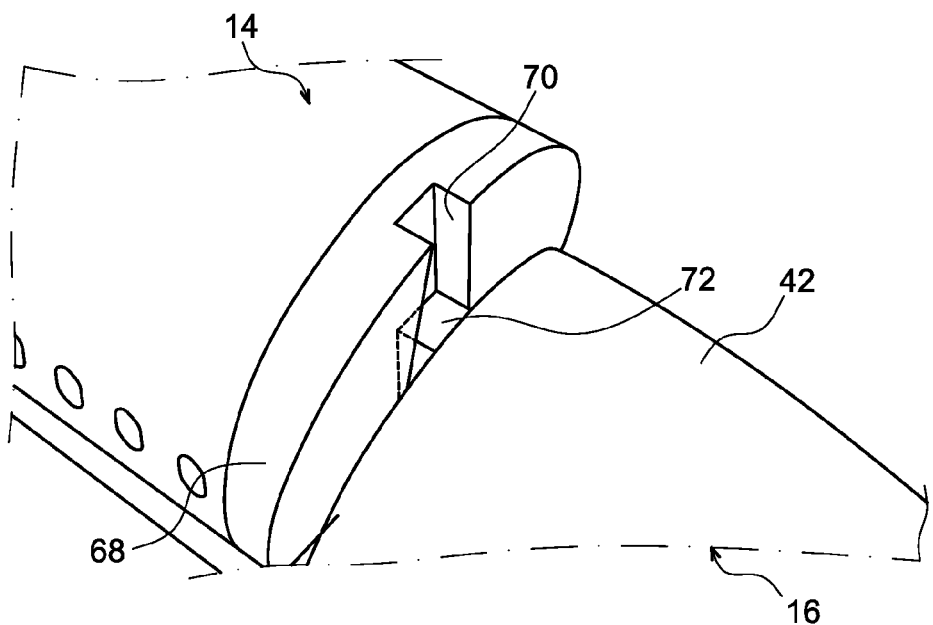
FIG. 5 is a partial schematic view of the removable cabin module and of the aircraft in the course of said transfer.
Figure 6:
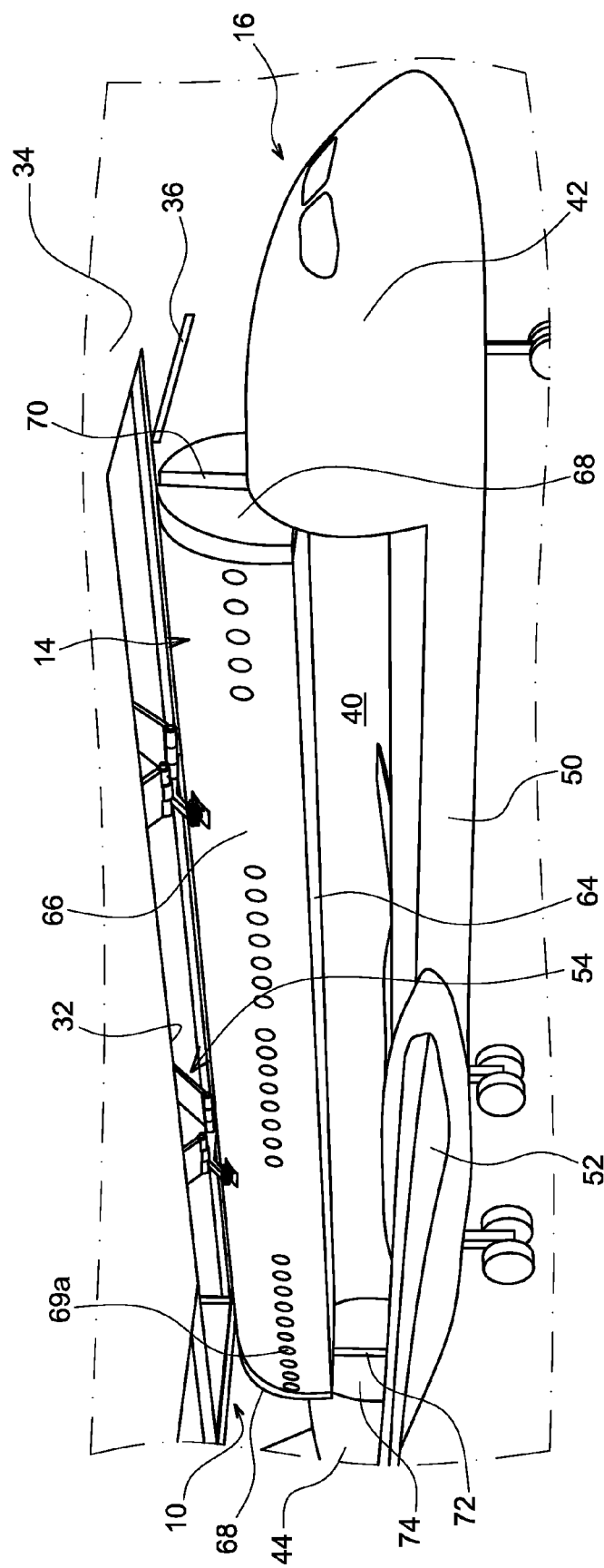
FIG. 6 is a partial schematic view of the air terminal, of the removable cabin module and of the aircraft in the course of said transfer.

FIGS. 5 and 6 illustrate how removable cabin module 14 is positioned in reception space 40 of aeroplane 16.

As can be seen in these figures, removable cabin module 14 is delimited externally by a flat lower lengthways wall 64 (FIG. 6), by an upper lengthways wall 66 shaped like a portion of a cylinder, forming an upper portion of the fuselage of aeroplane 16, and by two transverse end walls connected to the two previous ones. Upper wall 66 is connected to lower wall 64, which extends in a plane truncating upper wall 66. It should be noted that lower wall 64 extends parallel to a floor of the passenger cabin delimited inside removable cabin module 14. In the illustrated example, upper wall 66 includes multiple windows 69a (FIG. 6), together with a door 69b (FIG. 2).

Each of end walls 68 (FIGS. 5 and 6) includes a median vertical groove 70 open in the direction of the outside of the module, and extending from the module's lower end, preferably as far as its upper end. Each groove 70 is intended to receive a locking tab 72 formed on a corresponding transverse wall 74 which delimits nose cone 42, or respectively tail cone 44, of aeroplane 16. As illustrated by FIGS. 5 and 6, the engagement of tab 72 in groove 70 helps centre cabin module 14 and guide it to its final docking position in aeroplane 16.

Figure 7:
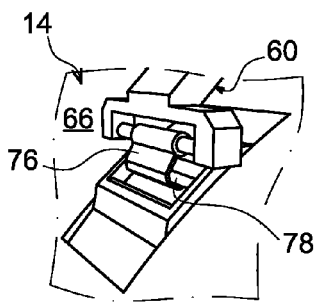
FIGS. 7 and 8 are partial perspective schematic views of a lifting device which forms part of said docking module.
Figure 8:
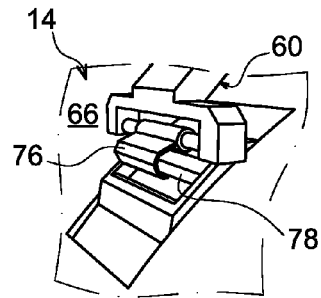

FIGS. 7 and 8 represent an end portion of one of attachment devices 60 of lifting device 54, together with upper lengthways wall 66 of removable cabin module 14, and show in particular one of hinged hooks 76 of attachment device 60.

FIG. 7 illustrates hook 76 in its clamped position. The hook is then brought close to removable cabin module 14 such that it becomes engaged with a corresponding lengthways rod 78 on upper wall 66 of removable cabin module 14, which forms a docking element.

FIG. 8 illustrates hook 76 in its unclamped position. The hook is then separated from cabin module 14 such that it can be released from rod 78.

It should be noted that rods 78 form docking elements of cabin module 14, in the terminology of the present invention.

Figure 9:
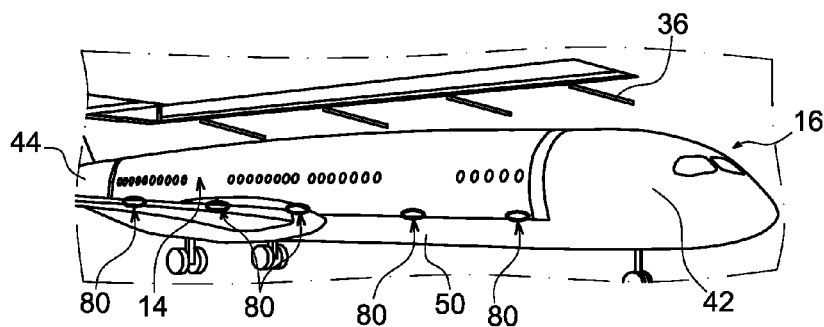
FIG. 9 is a partial perspective schematic view of the air terminal and of the aircraft of FIG. 1, showing said removable cabin module installed in the aircraft.
Figure 10:
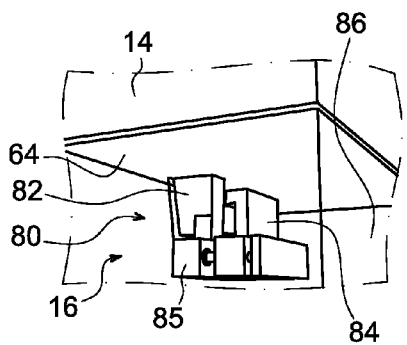
FIGS. 10 and 11 are partial perspective schematic views of the aircraft of FIG. 1, which illustrate first devices for docking the removable cabin module.
Figure 11:
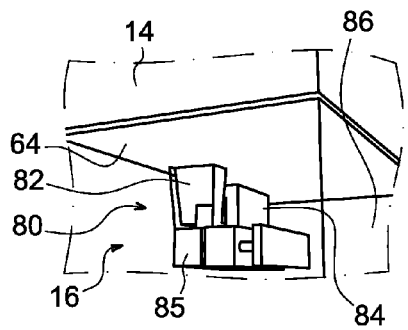

FIGS. 9 to 11 illustrate first devices 80 for docking removable cabin module 14 to aeroplane 16. These devices 80 are distributed along the length of cabin module 14, close to both its lateral ends. Each of these devices includes a first element forming a hook 82 which is coupled securely with cabin module 14, and a second element forming a hook 84, having an L-shaped section, coupled securely to aeroplane 16. The first element 82 forming a hook extends essentially as a downward projection from the lower lengthways wall 64 of module 14, whereas second element 84 forming a hook extends essentially as an upward projection from the base of a cavity made in a flat upper wall 86 of lower structure 50 of the aeroplane (also visible in FIG. 1). At least one of the two elements 82, 84 forming hooks, for example element 84, which is coupled securely to aeroplane 16, can be moved laterally in the transverse direction towards the other element forming a hook, by means of an actuator 85.

When cabin module 14 is resting on upper wall 86 of lower structure 50 of the aeroplane, first element 82 forming a hook extends inside the cavity containing corresponding second element 84 forming a hook, facing the latter, such that operation of corresponding actuator 85 causes a mutual engagement of the two elements, allowing cabin module 14 to be held in aeroplane 16.

Figure 12:
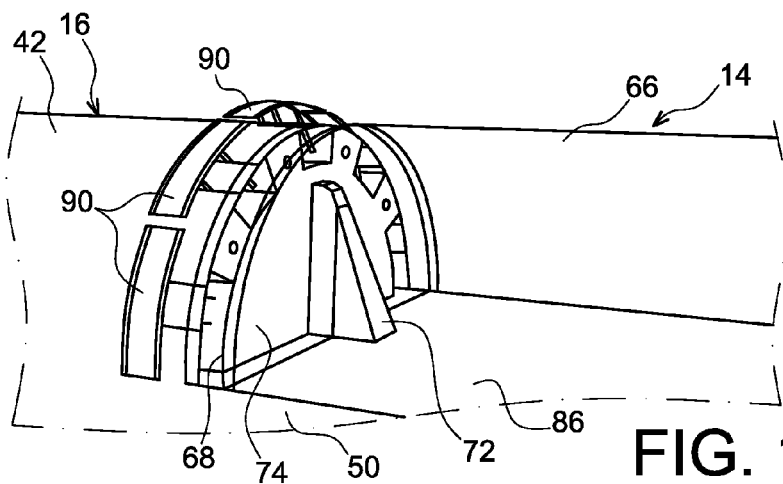
FIGS. 12 through 14 are partial perspective schematic views of the aircraft of FIG. 1, which illustrate second devices for docking the removable cabin module.

In FIG. 12, a lengthways end of cabin module 14 can be seen facing a lengthways end of nose cone 42 of aeroplane 16. Locking tab 72 can be seen, which extends as an upward projection from upper wall 86 of lower structure 50 of the aeroplane and as a projection towards the space of reception of removable cabin module 40, i.e. towards the rear, from transverse wall 74 delimiting nose cone 42. The top of this locking tab 72 is slender in shape, i.e. the lengthways extent of tab 72 is smaller at the top than at the bottom. The shape of vertical groove 70 (FIG. 6) of module 14 intended to receive tab 72 is roughly conjugate with the shape of this tab 72.

As explained above, groove 70 and tab 72 allow transverse positioning of cabin module 14 relative to aeroplane 16 to be facilitated when the former is being docked to the latter. These means in particular allow cabin module 14 to be guided lengthways by a corner effect, during docking, to its final position on aeroplane 16, and then allow this module 14 to be held in this position.

Figure 13:
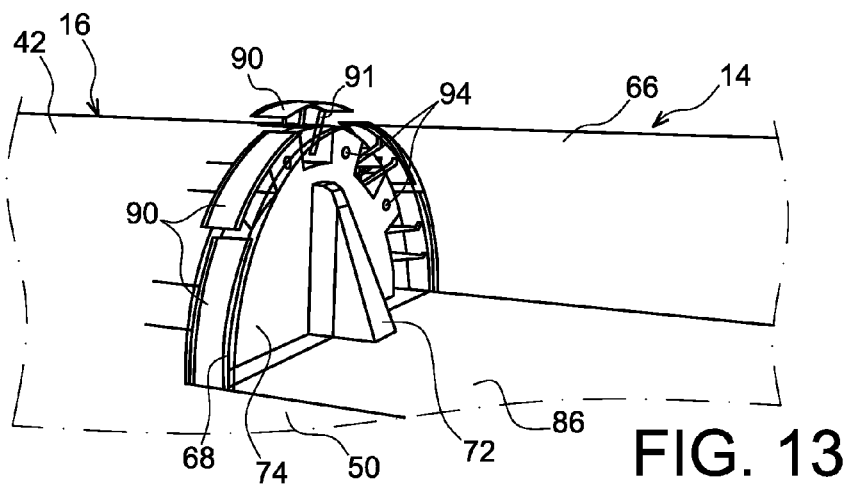

As is shown by FIG. 12, aeroplane 16 includes fairing elements 90 intended to provide aerodynamic continuity between the portion of the fuselage which streamlines nose cone 42 and upper wall 66 of cabin module 14. These elements 90 are installed on hinged arms 91 (FIG. 13) allowing these elements to be moved between an open position, represented in FIG. 12, in which these elements are radially separated towards the outside and towards the front of the aeroplane, in order to enable cabin module 14 to be conveyed to its final position of docking to the aeroplane, and a closed position, illustrated in FIG. 14, in which these elements are radially brought back towards the inside and towards the rear, such that they cover a space between nose cone 42 and cabin module 14. In this closed position, elements 90 provide the aerodynamic continuity of the fuselage of aeroplane 16. FIG. 13 illustrates an intermediate position of fairing elements 90.

Figure 14:
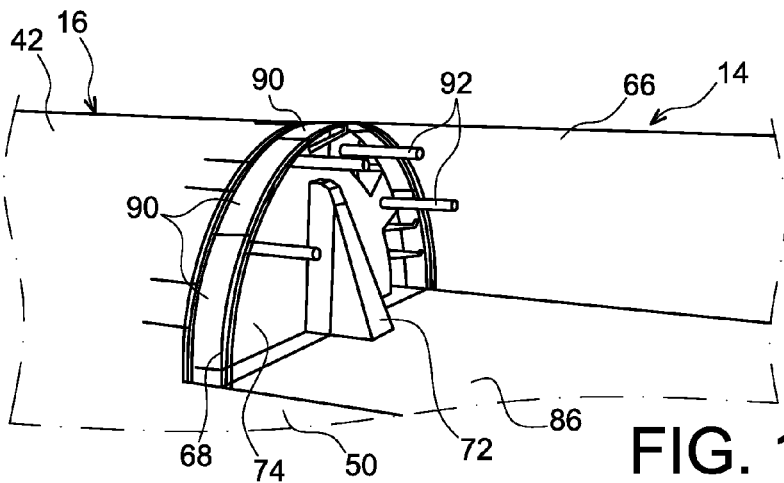

FIGS. 12 to 14 also illustrate second docking devices of removable cabin module 14 to aeroplane 16, fitted to the lengthways ends of module 14 and to the corresponding ends of nose cone 42 and tail cone 44 of aeroplane 16.

These second docking devices include lengthways rods 92 (FIG. 14) intended to assist radial retention of cabin module 14 on aeroplane 16. These rods 92 are installed sliding in lengthways bores 94 (FIG. 13) made in transverse wall 74 delimiting nose cone 42, and can be slid lengthways between a retracted position, in which rods 92 are fully housed in bores 94 (FIG. 13), and a deployed position, in which rods 92 project outside bores 94 (FIG. 14) and penetrate in corresponding bores (not visible in the figures) made in corresponding end transverse wall 68 of cabin module 14.

First and second docking devices 80, 92 form means for holding cabin module 14 in reception space 40.

The foregoing description of elements 70, 72, 90, 92 with reference to FIGS. 12 to 14 can be transposed to tail cone 44 of aeroplane 16, and to the corresponding lengthways end of cabin module 14.

It can be seen from the above description that air terminal 10 and aeroplane 16 allow implementation of a method for transferring a payload such as passengers and/or luggage and/or freight, between air terminal 10, and therefore more generally an aerodrome or airport including this air terminal, and the cabin of aeroplane 16 housed in removable cabin module 14. This method is remarkable in that removable cabin module 14 is separated from aeroplane 16 and is docked to docking module 12 during the transfer.

FIGS. 1 to 14 illustrate the main successive steps of a method for boarding passengers on board aeroplane 16 according to a preferred embodiment of the invention.

This method includes the transfer of the passengers from room 24 of air terminal 10 into the cabin integrated in cabin module 14 docked to docking module 12 (FIGS. 1 and 2) via door 26*a* of docking module 12 and door 69*b* of cabin module 14 facing above-mentioned door 26*a*.

On completion of this transfer doors 69*b* and 26*a* are closed, and beams 36 are then retracted (FIG. 3).

Cabin module 14 is then moved downwards by means of lifting device 54, passing through opening 32 of floor 34 of room 24 (FIG. 4), and then put in position in aeroplane 16 (FIGS. 5 and 6) after engaging locking tabs 72 in corresponding grooves 70.

Lifting device 54 is then uncoupled from cabin module 14 (FIGS. 7 and 8), and devices 80 and 92 for docking cabin module 14 to aeroplane 16 are activated (FIGS. 9 to 14).

Aeroplane 16 is then ready to move to a takeoff runway.

The same steps can be performed in reverse order to implement a method for deplaning the passengers from aeroplane 16.

The foregoing description can naturally be transposed to the loading and unloading of luggage or freight.

Aeroplane 16 described above also has the advantage that it is easy to replace removable cabin module 14 by another removable cabin module, which can be distinguished from the first, for example, by the internal layout of its cabin, or even by the type of payload which can be housed in it.

Aeroplane 16 is thus suitable for implementing a method for modifying the internal configuration of its passenger or freight cabin, including at least the following steps:

deactivation of docking means 80, 92 holding a first removable cabin module 14 in a reception space 40 in the aircraft 16;

removal of this first cabin module 14 outside this reception space 40;

installation, in reception space 40, of a second removable cabin module 14 having an internal configuration different to that of the first removable cabin module;

activation of docking devices 80, 92 to hold the second module in the reception space.

It is thus easy for an airline to replace a module having an economy class cabin by a module having a first class or business class cabin, or vice versa.

It is also easy to replace a module suitable for passenger transport by a module suitable for freight transport.

The method can also be implemented in the course of manufacture of aeroplane 16, in order to install a cabin module in the aeroplane which is specially equipped for testing, and subsequently, after testing, to replace this cabin module by a module suitable for commercial exploitation of the aeroplane in preparation for its final delivery.

What is claimed is:

1. An aircraft comprising:

a removable cabin module, comprising a floor, an upper aircraft fuselage portion connected to the floor, and a first and a second end wall, wherein the first and second end walls, the floor and the upper aircraft fuselage portion form a cabin for transport of passengers, luggage, freight or combinations thereof;

a reception space for receiving the removable cabin module;

a nose cone comprising a cockpit and a transverse wall;

a tail cone comprising a tail unit and a transverse wall;

a lower structure comprising a lower fuselage portion truncated in a horizontal plane, wherein the reception space is delimited between the transverse wall of the nose cone and the transverse wall of the tail cone, and above the horizontal plane of the lower structure;

a centring device for centring the removable cabin module in the reception space; and a retaining device for retaining the removable cabin module in the reception space, wherein the retaining device comprises a first docking device for securely coupling the floor of the removable cabin module to the horizontal plane of the lower structure, wherein the first docking device comprises a first element forming a hook which is coupled securely to the floor of the removable cabin module, and a second element forming a hook coupled securely to the horizontal plane of the lower structure, wherein the retaining device comprises a second docking device for securely coupling the first or second end wall of the removable cabin module to the transverse wall of the nose cone or the transverse wall of the tail cone, wherein the second docking device comprises a lengthways rod retractably housed in a bore in the transverse wall of the nose cone, the transverse wall of the tail cone, or both.

2. The aircraft of claim 1, wherein the first docking device comprises a plurality of first elements distributed along a length of the floor of the removable cabin module, and a plurality of second elements distributed along a length of the horizontal plane of the lower structure.

3. The aircraft of claim 1, wherein the first element forming a hook extends as a downward projection from the floor of the removable cabin module, wherein the second element forming a hook extends as an upward projection from the horizontal plane of the lower structure.

4. The aircraft of claim 1, wherein at least one of the first or second elements forming hooks in the first docking device further comprises an actuator, wherein the actuator moves the first or second element forming a hook laterally in the transverse direction towards the other element forming a hook.

5. The aircraft of claim 4, wherein operation of the actuator when the removable cabin module is in the reception space of the aircraft causes a mutual engagement of the first and second elements forming hooks thereby securing the removable cabin module to the lower structure of the aircraft.

6. The aircraft of claim 1, wherein the second docking device further comprises a bore in the first or second end wall of the removable cabin module, wherein the bore in the first or second end wall of the removable cabin module aligns with the bore in the transverse wall of the nose cone or the transverse wall of the tail cone such that deploying the lengthways rod retractably housed in the bore in the transverse wall of the nose cone or the bore in the transverse wall of the tail cone causes the rod to penetrate the bore in the first or second end wall of the removable cabin module.

7. The aircraft of claim 6, wherein the second docking device comprises a plurality of lengthways rods retractably housed in a plurality of bores in the transverse wall of the nose cone, the transverse wall of the tail cone, or both, and a plurality of corresponding bores in the first or second end walls of the removable cabin module.

8. The aircraft of claim 6, wherein the second docking device provides radial retention of the removable cabin module in the reception space of the aircraft.

9. The aircraft of claim 1, wherein the centring device for centring the removable cabin module in the reception space comprises a tab extending from the transverse wall of the nose cone and a corresponding slot in the first or second end wall of the removable cabin module.

10. The aircraft of claim 9, wherein the centring device provides for transverse positioning of the removable cabin module in the receiving space of the aircraft.

11. The aircraft of claim 1, further comprising fairing elements which provide aerodynamic continuity between the nose cone and the upper aircraft fuselage portion of the removable cabin module, between the tail cone and the upper aircraft fuselage portion of the removable cabin module, or both.

12. The aircraft of claim 11, wherein the fairing elements are installed on hinged arms connected to the nose cone, the tail cone, or both, thereby allowing the fairing elements to be moved to and between an open position and a closed position.

13. A removable cabin module for an aircraft comprising:
a floor;
an upper aircraft fuselage portion connected to the floor;
a first and a second end wall;
a centring device; and
a retaining device, wherein the retaining device comprises a first docking device for securely coupling the floor of the removable cabin module to a reception space of the aircraft, wherein the first docking device comprises a first element forming a hook which is coupled securely to the floor of the removable cabin module, and a second element forming a hook coupled securely to a horizontal plane of a lower structure of the aircraft, wherein the retaining device comprises a second docking device for securely coupling the first or second end wall of the removable cabin module to the reception space of the aircraft, wherein the second docking device comprises a lengthways rod retractably housed in a bore of at least one transverse wall of the aircraft;
wherein the first and second end walls, the floor and the upper aircraft fuselage portion form a cabin for transport of passengers, luggage, freight or combinations thereof;
wherein the removable cabin module is receivable in the reception space of the aircraft;
wherein the centring device centers the removable cabin module in the reception space of the aircraft; and
wherein the retaining device retains the removable cabin module in the reception space of the aircraft.

14. The removable cabin module of claim 13, wherein the upper aircraft fuselage portion forms a partial cylindrical shape matching a cylindrical shape of a fuselage of an aircraft.

15. The removable cabin module of claim 13, further comprising a window, a door, or a combination thereof.

16. The removable cabin module of claim 13, wherein the first element forming a hook engages the corresponding second element forming a hook coupled securely to the horizontal plane of the lower structure of the aircraft.

17. The removable cabin module of claim 16, wherein the first docking device comprises a plurality of elements forming hooks distributed along a length of the floor of the removable cabin module.

18. The removable cabin module of claim 16, wherein the first element forming a hook extends as a downward projection from the floor of the removable cabin module.

19. The removable cabin module of claim 13, wherein the centring device for centring the removable cabin module in a reception space of an aircraft comprises a slot in the first or second end wall of the removable cabin module, wherein the slot engages a tab in the reception space of the aircraft.

* * * * *